_(12)_ United States Patent
Slawinski

(10) Patent No.: US 8,722,567 B2
(45) Date of Patent: May 13, 2014

(54) PARTICULATE METALLOCENE-ALUMOXANE CATALYST

(71) Applicant: Total Research & Technology Feluy, Seneffe (BE)

(72) Inventor: Martine Slawinski, Nivelles (BE)

(73) Assignee: Total Research & Technology Feluy, Seneffe (Feluy) (BE)

( * ) Notice: Subject to any disclaimer, the term of this patent is extended or adjusted under 35 U.S.C. 154(b) by 0 days.

(21) Appl. No.: 13/965,633

(22) Filed: Aug. 13, 2013

(65) Prior Publication Data

US 2014/0045681 A1       Feb. 13, 2014

Related U.S. Application Data

(63) Continuation of application No. 13/514,092, filed as application No. PCT/EP2010/070047 on Dec. 17, 2010, now Pat. No. 8,552,125.

(30) Foreign Application Priority Data

Dec. 18, 2009   (EP) .................................... 09179798

(51) Int. Cl.
| | | |
|---|---|---|
| *B01J 21/00* | (2006.01) | |
| *C08F 4/00* | (2006.01) | |
| *C08F 4/06* | (2006.01) | |
| *C08F 4/44* | (2006.01) | |
| *B01J 20/00* | (2006.01) | |

(52) U.S. Cl.
USPC ............. 502/232; 502/407; 502/414; 526/90; 526/126; 526/160

(58) Field of Classification Search
USPC ............. 502/232, 407, 414; 526/90, 126, 160
See application file for complete search history.

(56) References Cited

U.S. PATENT DOCUMENTS 6,291,611 B1 *    9/2001   Kallio et al. .................. 526/129

\* cited by examiner

*Primary Examiner* — William Cheung

(57) ABSTRACT

The invention relates to a process for the preparation of a particulate polyethylene product in a loop reactor, wherein the polymerization catalyst applied in the polymerization process comprises a particulate metallocene-alumoxane catalyst immobilized on a porous silica support; and whereby said metallocene-alumoxane catalyst is heterogeneously distributed on said porous silica support.

19 Claims, 5 Drawing Sheets

Aluminum Kα1

Silicon Kα1

PARTICULATE METALLOCENE-ALUMOXANE CATALYST

CROSS-REFERENCE TO RELATED APPLICATIONS

This application is a Continuation of U.S. application Ser. No. 13/514,092, filed on Jul. 9, 2012, now U.S. Pat. No. 8,552,125, which claims the benefit of PCT/EP2010/070047, filed on Dec. 17, 2010, which claims priority from EP 09179798.5, filed on Dec. 18, 2009.

TECHNICAL FIELD OF THE INVENTION

The present invention relates to a process for the preparation of a particulate polyethylene product. According to the invention, polyethylene products are prepared in a polymerization loop reactor, wherein the polymerization is catalyzed by a metallocene-alumoxane catalyst which is heterogeneously distributed on an inert support.

BACKGROUND OF THE INVENTION

Polyethylene (PE) is synthesized by polymerizing ethylene ($CH_2$=$CH_2$) monomers. Because it is cheap, safe, stable to most environments and easy to be processed polyethylene polymers are useful in many applications. According to the properties polyethylene can be classified into several types, such as but not limited to LDPE (Low Density Polyethylene), LLDPE (Linear Low Density Polyethylene), and HDPE (High Density Polyethylene). Each type of polyethylene has different properties and characteristics.

Ethylene polymerizations are frequently carried out in a loop reactor using ethylene monomer, liquid diluent and catalyst, optionally one or more co-monomer(s), and hydrogen. The polymerization in a loop reactor is usually performed under slurry conditions, with the produced polymer usually in a form of solid particles which are suspended in the diluent. The slurry in the reactor is circulated continuously with a pump to maintain efficient suspension of the polymer solid particles in the liquid diluent. Polymer slurry is discharged from the loop reactor by means of settling legs, which operate on a batch principle to recover the slurry. Settling in the legs is used to increase the solids concentration of the slurry finally recovered as product slurry. The product slurry is further discharged through heated flash lines to a flash tank, where most of the diluent and unreacted monomers are flashed off and recycled.

Polymerization of ethylene involves the polymerization of ethylene monomer in the reactor in the presence of a polymerization catalyst. Suitable catalysts for the preparation of polyethylene comprise chromium-type catalysts, Ziegler-Natta catalysts and metallocene catalysts.

The use of metallocene catalysts for polymerization and copolymerization of ethylene is a relatively recent development. Processes for producing polyolefins in general and polyethylene in particular in the presence of metallocene catalysts have been described. Metallocenes are often combined with activating agents such as alumoxanes, to improve the catalytic activity of the metallocene.

A supported metallocene-alumoxane polymerization catalyst essentially comprises an inert support or carrier such as silica, on which alumoxane and metallocene are coated. In many applications for the production of polyolefins such as polyethylene, a porous support is used. The properties of such porous supports such as pore density or surface area greatly influence the physicochemical characteristics of the final polyolefin product. An increased surface area of a porous support compared to a non-porous support in theory leads to an increase in bound catalytically active sites.

Major objectives of a plant for producing polyethylene and its copolymers include the preparation of polymers having physical properties within certain specifications and the optimization of economical goals such as a specific catalyst consumption and the production rate of the plant. That is, it is desired to minimize the consumption of catalyst per ton of produced polymer, this leading to increased catalyst productivity and to a reduction in the amount of catalyst residue in the product, as well as to the maximization of the amount of polymer produced per hour.

However, although polymerization reactions in the presence of metallocene-alumoxane polymerization catalysts supported on porous supports yield polymerization products with improved physico-mechanical properties, such as uniformity, miscibility, density or molecular weight distribution, compared to polymerization reactions in the presence of non-supported catalysts, the catalyst activity of such supported catalysts is believed to be generally lower than the catalyst activity of non-supported catalysts. Hence, lower amounts of polymer per given amount of catalyst can be produced in the presence of catalysts supported on porous supports than when carrying out polymerization reactions in the presence of non-supported catalysts.

Moreover, when carrying out polymerization reactions in the presence of catalyst having low catalyst activity, higher amounts of catalyst have to be used for preparing a given amount of polymer product. In view thereof, higher amounts of catalyst may remain in the prepared polymer products, and hence such polymers may contain higher ash content. Especially, when using metallocene catalyst problems related to insufficient catalyst activity, and consequences thereof in the resulting polymer products such as to elevated ash content, may occur. For applications in food packaging or dielectric materials, high ash content is unwarranted. In these kinds of applications removal of the ash content in the polymer product needs to be carried out post-production, for instance by applying various washing and extraction techniques, which are costly and time-consuming.

In view of the above, many applications which make use of catalyst systems provided on porous supports still require improved catalyst activity to increase productivity of the polymerization reaction and hence to increase the amount of polymer product produced. Hence there remains a need in the art to provide a polymerization process for making polyolefin resin, and in particular polyethylene resin using supported catalyst having improved productivity.

It is also a need in the art to improve polymerization reactions as to reduce ash content of produced polymers which can then be used in various impurity-sensitive applications at minimal investment of additional cost and time.

In view of the above, it is an object of the present invention to provide a polymerization process for making polyolefin resin using a supported catalyst having improved activity. It is in particular an object to provide a polymerization process for making polyethylene using a supported metallocene-alumoxane catalyst having improved activity.

SUMMARY OF THE INVENTION

The present invention provides a process for preparing polyethylene that is carried out in the presence of a supported metallocene-alumoxane catalyst in a loop reactor. The present process is at least in part based on the use of a supported metallocene-alumoxane catalyst whereby the alumoxane is heterogeneously distributed on a porous support. The process according to the invention permits to prepare polyethylene by means of a polymerization catalyst having increased catalytic activity, and hence provides a polymerization product having acceptable properties and reduced ash content.

Thereto, the invention relates in a first aspect to a process for preparing a particulate polyethylene product in a polymerization loop reactor, comprising the steps of:
(a) feeding ethylene monomer, a liquid hydrocarbon diluent, optionally hydrogen, and optionally olefin co-monomer into said loop reactor;
(b) feeding a polymerization catalyst into said loop reactor;
(c) polymerizing said monomer and said optionally co-monomer to produce a polyethylene slurry in said diluent in said loop reactor;
(d) allowing said polyethylene slurry to settle into one or more settling legs connected to said loop reactor;
(e) discharging the settled polyethylene slurry from said one or more settling legs out of said loop reactor;
wherein said polymerization catalyst comprises a particulate metallocene-alumoxane catalyst immobilized on a porous silica support wherein said alumoxane is heterogeneously distributed.

According to an embodiment the invention provides a method wherein said polymerization loop reactor is a single loop reactor.

In another embodiment the invention provides a method wherein said polymerization loop reactor is a loop reactor of a double loop reactor consisting of two serially connected loop reactors. In an example, said the invention provides a method wherein said polymerization loop reactor, as described above, is a first reactor of a double loop reactor.

The molar ratio of aluminum, provided by said alumoxane, to transition metal, provided by said metallocene, in said polymerization catalyst is generally homogenous/constant over the complete catalyst particle. Therefore, in another embodiment, the invention relates to a process for preparing a particulate polyethylene product in a polymerization loop reactor as given above, wherein said polymerization catalyst comprises a particulate metallocene-alumoxane catalyst immobilized on a porous silica support wherein said metallocene is heterogeneously distributed.

The product recovered in accordance with the process according to the invention is a granular polyethylene product, also named particulate polyethylene product. The term "particulate" in the present context intends to refer to particles. The catalysts which are used in the process according to the invention are metallocene-based catalysts, which have controlled granulometry and properties. More in particular, said metallocene-based catalysts include particulate catalysts comprising a metallocene and an alumoxane which are provided on silica porous support.

The term "heterogeneously" distributed as used herein and as opposed to "homogenously distributed", intends to refer to the feature that the alumoxane component of said catalyst, and thus inherently also said metallocene-alumoxane catalyst, is not evenly distributed throughout said support. Hence the support shows areas or surfaces having significantly more alumoxane, and thus also significantly more metallocene, bound thereto than other areas or surfaces of said support.

During the polymerization process supported polymerization catalysts, such as metallocene-alumoxane catalysts which are immobilized on an inert support, become fragmented, the fragments becoming distributed throughout the final polymer product. The amounts of the individual residual elements relative to the total amount of polymer product are collectively referred to as the ash content. This is an important parameter as in many end product applications such as food packaging or dielectric materials there are limits on the acceptable amount of ash in the polymer product. There is a demand in the art for polymer product having lower ash content.

It has now been found that a heterogeneous distribution of an activating agent, in particular alumoxane, on an inert porous support, such as silica, increases catalyst activity, and hence increases the amount of final polymer product that can be prepared with a given amount of catalyst.

Also, by using the present polymerization catalyst for preparing a given amount of polymer product, lower amounts of catalyst need to be used, resulting in a lower ash content in the resulting polymer product. Hence, the resulting polymer product will have broader applicability or more potential end uses.

According to the invention, by providing a polymerization catalyst having a Al/Si ratio, wherein the aluminum is provided by the alumoxane and the silicon is provided by the silica support, which is higher outside the support than inside said support, said polymerization catalyst obtains increased activity. In a particular embodiment, the invention provides a process wherein the molar ratio of aluminum, provided by said alumoxane, to silicon, provided by said support, is at least twofold higher at the surface of said support than inside said support. As used herein, the term "outside the support" can be represented as the outer 30% of the volume of the particle, preferably the outer 25% of the volume of the particle, more preferably the outer 10% of the volume of the particle.

in yet another embodiment, the invention provides a process wherein the molar ratio of aluminum, provided by said alumoxane, to silicon, provided by said support inside of said support is comprised between 0.2 and 0.8. As used herein, the term "inside the support" can be represented as the inner 70% of the volume of the particle, preferably the inner 50% of the volume of the particle.

In yet another embodiment, the invention provides a process wherein the molar ratio of aluminum, provided by said alumoxane, to silicon, provided by said support on the external surface of the porous support is comprised between 0.4 and 8.

The invention also provides a process wherein said porous silica support has a surface area comprised between 200 and 700 m$^2$/g.

In another embodiment, the invention provides a process, wherein said porous silica support has a pore volume comprised between 0.5 and 3 ml/g.

In yet another embodiment, the invention provides a process, wherein said porous silica support has an average pore diameter comprised between 50 and 300 Angstrom, and for instance between 75 and 220 Angstrom.

In still another embodiment, the invention provides a process, wherein the molar ratio of aluminum, provided by said alumoxane, to transition metal provided by said metallocene, in said polymerization catalyst, is substantially constant over the catalyst, and is for instance comprised between 10 and 1000, and for instance between 50 and 500.

In an embodiment, the invention relates to a process as described above wherein said metallocene has formula (I) or (II)

$$(Ar)_2MQ_2 \qquad (I)$$

for non-bridged metallocenes; or

$$R''(Ar)_2MQ_2 \qquad (II)$$

for bridged metallocenes
wherein each Ar is independently selected from the group consisting of cyclopentadienyl, indenyl, tetrahydroindenyl, and fluorenyl; and wherein Ar is optionally substituted with one or more substituents each independently selected from the group consisting of halogen, a hydrosilyl, a $SiR_3$ wherein R is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl and P;

wherein M is a transition metal selected from the group consisting of titanium, zirconium, hafnium and vanadium;

wherein each Q is independently selected from the group consisting of halogen; a hydrocarboxy having 1 to 20 carbon atoms; and a hydrocarbyl having 1 to 20 carbon atoms wherein said hydrocarbyl optionally contains one or more atoms selected from the group comprising B, Si, S, O, F, Cl and P;

wherein R" is a bridge between the two Ar and selected from the group consisting of a $C_1$-$C_{20}$ alkylene, a germanium, a silicon, a siloxane, an alkylphosphine and an amine, wherein said R" is optionally substituted with one or more substituents each independently selected from the group consisting of halogen, a hydrosilyl, a $SiR_3$ wherein R is a hydrocarbyl having 1 to 20 carbon atoms, and a hydrocarbyl having 1 to 20 carbon atoms, and wherein said hydrocarbyl optionally contains one or more atoms selected from the group comprising B, Si, S, O, F, Cl and P.

In a further embodiment, the invention relates to a process as described above wherein said alumoxane has formula (III) or (IV)

R—(Al(R)—O)$_x$—AlR$_2$     (III)

for oligomeric, linear alumoxanes; or

(—Al(R)—O)$_y$     (IV)

for oligomeric, cyclic alumoxanes
wherein x is 1-40, y is 3-40, and each R is independently selected from a $C_1$-$C_8$ alkyl.

In a preferred embodiment, the invention relates to a process as described above wherein M is zirconium. In other words, in a preferred embodiment, said metallocene comprises the transition metal zirconium.

In another preferred embodiment, the invention relates to a process as described above wherein said alumoxane is methylalumoxane.

Main benefits of using the herein described polymerization catalyst in a method of the invention include the preparation of polymers having physical properties within certain specifications, increased catalyst productivity, a reduction in the amount of catalyst residue in the product, as well as a maximization of the amount of polymer produced per hour, and improved polyethylene production rate.

In another aspect, the invention relates to a polyethylene product obtainable or obtained by carrying out the process according to the present invention.

With the insight to better show the characteristics of the invention, some preferred embodiments and examples are described hereafter.

DETAILED DESCRIPTION OF THE INVENTION

Figure 1A:
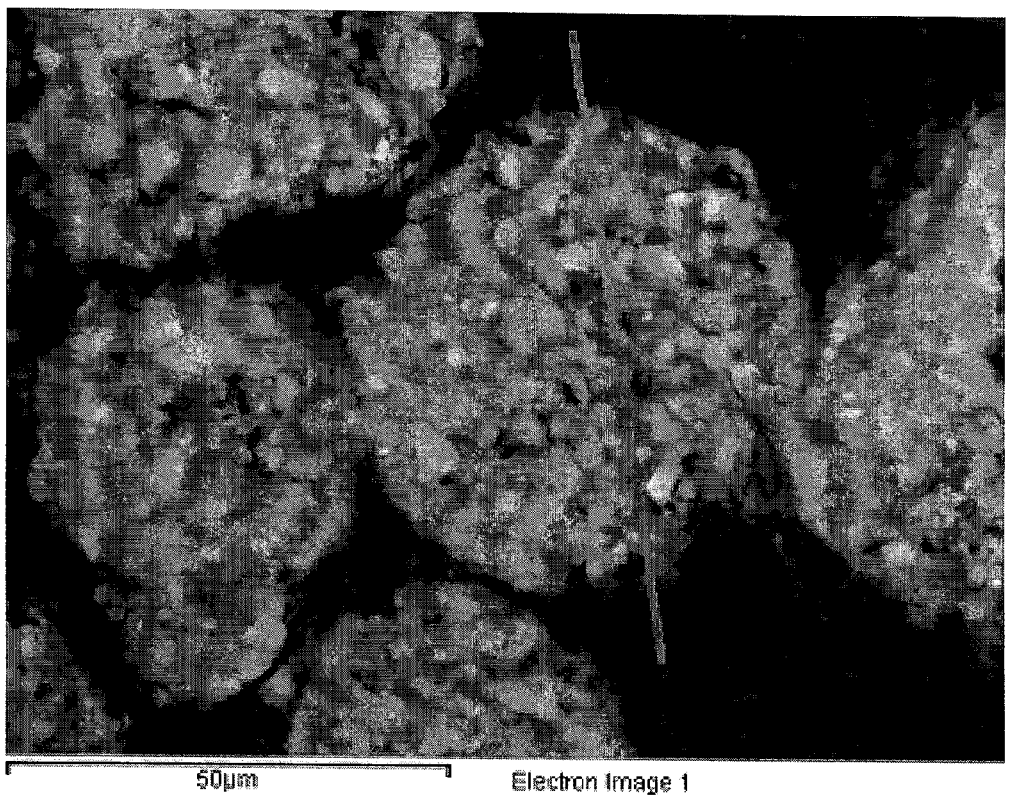
FIG. 1 represents scanning electron microscopy (SEM) image and energy-dispersive X-ray spectroscopy (EDX) spectra of a particulate metallocene-alumoxane catalyst immobilized on a porous silica support; and whereby said metallocene-alumoxane catalyst is homogeneously distributed on said porous silica support (A): SEM image of a particulate metallocene-alumoxane catalyst immobilized on a porous silica support; and whereby said metallocene-alumoxane catalyst is homogeneously distributed on said porous silica support (B) EDX linescan spectrum showing counts of Al coming from the particle illustrated in (A). (C) EDX linescan spectrum showing counts of Si coming from the particle illustrated in (A). After normalization of each signal Al/Si was found to be equal to 1 for the homogeneous particle.

Before the present method and products of the invention are described, it is to be understood that this invention is not limited to particular methods, components, products or combinations described, as such methods, components, products and combinations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

All documents cited in the present specification are hereby incorporated by reference in their entirety.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

The present invention relates to a process for the preparation of a particulate polyethylene product in a loop reactor, comprising the steps of polymerizing ethylene monomer in the presence of a polymerization catalyst whereby said polymerization catalyst comprises a particulate metallocene-alumoxane catalyst immobilized on a porous support. In particular, the invention provides a process for preparing a particulate polyethylene product in a polymerization loop reactor, comprising the steps of:

(a) feeding ethylene monomer, a liquid hydrocarbon diluent, optionally hydrogen, and optionally olefin co-monomer into said loop reactor;
(b) feeding a polymerization catalyst into said loop reactor;
(c) polymerizing said monomer and said optionally co-monomer to produce a polyethylene slurry in said diluent in said loop reactor;
(d) allowing said polyethylene slurry to settle into one or more settling legs connected to said loop reactor;
(e) discharging the settled polyethylene slurry from said one or more settling legs out of said loop reactor;

wherein said polymerization catalyst comprises a particulate metallocene-alumoxane catalyst immobilized on a porous support wherein said alumoxane is heterogeneously distributed on said support. The process is thus in particular characterized in that said alumoxane is heterogeneously distributed on said support. The polymerization catalyst as described herein preferably is a free-flowing and particulate catalyst structure in a form comprising dry particles.

The support or carrier is an inert organic or inorganic solid, which is chemically unreactive with any of the components of the conventional metallocene catalyst. Suitable support materials for the supported catalyst of the present invention include solid inorganic oxides, such as silica, alumina, magnesium oxide, titanium oxide, thorium oxide, as well as mixed oxides of silica and one or more Group 2 or 13 metal oxides, such as silica-magnesia and silica-alumina mixed oxides. Silica, alumina, and mixed oxides of silica and one or more Group 2 or 13 metal oxides are preferred support materials. Preferred examples of such mixed oxides are the silica-aluminas. Most preferred is silica. The silica may be in granular, agglomerated, fumed or other form.

Prior to its use, if desired, the support material may be subjected to a heat treatment and/or chemical treatment to reduce the water content or the hydroxyl content of the support material. Typical thermal pretreatments are carried out at a temperature from 30 to 1000° C. for a duration of 10 minutes to 50 hours in an inert atmosphere or under reduced pressure.

A porous support as provided herein can be considered as comprising a macroscopic (i.e. visible) external surface including the surface of any macrospores; and a (non visible) internal surface, i.e. the surface of pores provided inside said support. According to the invention, the alumoxane is not homogeneously distributed on the porous support. More alumoxane is present on certain areas of the porous support than on other areas of the porous support, i.e. the alumoxane concentration is heterogeneous or not uniform on the porous support. It is in particular preferred that the alumoxane be present in a substantially higher concentration "outside" the support than "inside" the support. By "inside" the support we mean the internal surface area of the support, including the surface lining the pores inside the support. "Inside" is therefore also used as synonym for the expressions "in the pores" of the porous support, or "inner pores" of the porous support. By "outside" the support we mean on the external surface of the support and the surface of any macropores. "Outside" is herein also used as synonym for the "external surface" or the "outer surface" of the porous support.

The concentration or distribution of alumoxane on the inside and the outside of the support can be expressed as the molar aluminum/silicon ratio or molar Al/Si ratio. This is the molar amount of aluminum per mole silicon. The molar amount of aluminum equals the molar amount of alumoxane. The molar amount of silicon equals the molar amount of silica. In an embodiment, the molar Al/Si ratio on the external surface of the porous support is at least twofold, and for instance at least 5, 10 or 20 fold the molar Al/Si ratio inside said support, i.e. in the pores of the porous support.

In an embodiment, the molar Al/Si ratio in the pores of the porous support is comprised between 0.2 and 0.8. In a non-limiting example, the molar Al/Si ratio in the pores of the porous support is 0.2, 0.3, 0.4, 0.5, 0.6, 0.7, or 0.8.

In another embodiment, the molar Al/Si ratio on the external surface of the porous support is comprised between 0.4 and 8, and for instance between 1.5 and 5.

The location or distribution of particles, such as alumoxanes, on a porous support can be measured by various techniques known by a skilled person, such as for instance Scanning Electron Microscope/Energy-Dispersive X-ray spectroscopy (SEM/EDX) analysis.

In other embodiments, the support of a polymerization catalyst as defined herein has one or more of the following properties.

In an embodiment, the invention provides a process wherein the support of the polymerization catalyst is a porous silica support having a median particle diameter comprised between 10 and 100 μm, and preferably between 10 and 55 μm. The "median particle diameter" as used herein, refers to the particle diameter of the catalyst for which fifty percent of the particles has a diameter lower than the median particle diameter. The "median particle diameter" or "d50" of a catalyst as used herein essentially refer to a same parameter and refer to the particle diameter of the catalyst for which fifty percent of the particles has a diameter lower than the d50. The catalyst's d50 is generally measured by laser diffraction analysis on a Malvern type analyzer after having put the catalyst in suspension in a solvent such as e.g. cyclohexane.

In an embodiment, the invention provides a process wherein the support of the polymerization catalyst is a porous support, and preferably a porous silica support having a surface area comprised between 200 and 700 $m^2/g$, and preferably between 250 and 350 $m^2/g$.

In another embodiment, the invention provides a process wherein the support of the polymerization catalyst is a porous support, and preferably a porous silica support having an average pore volume comprised between 0.5 and 3 ml/g, and preferably between 1 and 2 ml/g.

In yet another embodiment, the invention provides a process wherein the support of the polymerization catalyst is a porous support, and preferably a porous silica support having an average pore diameter comprised between 50 and 300 Angstrom, and preferably between 75 and 220 Angstrom.

Reference will now be made to the polymerization catalyst applied in the process according to the invention. The term "catalyst" as used herein, is defined as a substance that causes a change in the rate of a chemical reaction without itself being consumed in the reaction. The term "polymerization catalyst" and "catalyst" may be considered herein as synonyms. The catalysts used in the invention are metallocene-based catalysts.

As used herein, the term "metallocene" refers to a transition metal complex with a coordinated structure, consisting of a metal atom bonded to one or more ligands. The metallocenes which are used according to the invention are represented by formula (I) or (II):

  (I);

or

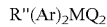  (II)

wherein the metallocenes according to formula (I) are non-bridged metallocenes and the metallocenes according to formula (II) are bridged metallocenes;
wherein said metallocene according to formula (I) or (II) has two Ar bound to M which can be the same or different from each other;
wherein Ar is an aromatic ring, group or moiety and wherein each Ar is independently selected from the group consisting of cyclopentadienyl, indenyl, tetrahydroindenyl or fluorenyl, wherein each of said groups may be optionally substituted with one or more substituents each independently selected from the group consisting of halogen, a hydrosilyl, a $SiR_3$ group wherein R is a hydrocarbyl having 1 to 20 carbon atoms, and a hydrocarbyl having 1 to 20 carbon atoms, and wherein said hydrocarbyl optionally contains one or more atoms selected from the group comprising B, Si, S, O, F, Cl and P;
wherein M is a transition metal selected from the group consisting of titanium, zirconium, hafnium and vanadium; and preferably is zirconium;
wherein each Q is independently selected from the group consisting of halogen; a hydrocarboxy having 1 to 20 carbon atoms; and a hydrocarbyl having 1 to 20 carbon atoms and wherein said hydrocarbyl optionally contains one or more atoms selected from the group comprising B, Si, S, O, F, Cl and P; and
wherein R" is a divalent group or moiety bridging the two Ar groups and selected from the group consisting of a $C_1$-$C_{20}$ alkylene, a germanium, a silicon, a siloxane, an alkylphosphine and an amine, and wherein said R" is optionally substituted with one or more substituents each independently selected from the group consisting of halogen, a hydrosilyl, a $SiR_3$ group wherein R is a hydrocarbyl having 1 to 20 carbon atoms, and a hydrocarbyl having 1 to 20 carbon atoms, and wherein said hydrocarbyl optionally contains one or more atoms selected from the group comprising B, Si, S, O, F, Cl and P.

The term "hydrocarbyl having 1 to 20 carbon atoms" as used herein is intended to refer to a moiety selected from the group comprising a linear or branched $C_1$-$C_{20}$ alkyl; $C_3$-$C_{20}$ cycloalkyl; $C_6$-$C_{20}$ aryl; $C_7$-$C_{20}$ alkylaryl and $C_7$-$C_{20}$ arylalkyl, or any combinations thereof.

Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl.

Exemplary halogen atoms include chlorine, bromine, fluorine and iodine and of these halogen atoms, fluorine and chlorine are preferred.

In accordance with the present invention, a process is provided wherein ethylene monomer is polymerized in the presence of a bridged or non-bridged metallocene.

"Bridged metallocenes" as used herein, are metallocenes in which the two aromatic transition metal ligands, denoted as Ar in formula (I) and (II) (i.e. the two cyclopentadienyl, indenyl, tetrahydroindenyl or fluorenyl groups) are covalently linked or connected by means of a structural bridge. Such structural bridge, denoted as R" in formula (I) and (II) imparts stereorigidity on the metallocene, i.e. the free movement of the metal ligands is restricted. According to the invention, the bridged metallocene consists of a meso or racemic stereoisomer.

In a preferred embodiment, the metallocenes which are used in a process according to the invention are represented by formula (I) or (II) as given above,
wherein Ar is as defined above, and wherein both Ar are the same and are selected from the group consisting of cyclopentadienyl, indenyl, tetrahydroindenyl and fluorenyl, wherein each of said groups may be optionally substituted with one or more substituents each independently selected from the group consisting of halogen, a hydrosilyl, a $SiR_3$ group wherein R is a hydrocarbyl having 1 to 20 carbon atoms as defined herein, and a hydrocarbyl having 1 to 20 carbon atoms as defined herein;
wherein M is as defined above, and preferably is zirconium, wherein Q is as defined above, and preferably both Q are the same and are selected from the group consisting of chloride, fluoride and methyl, and preferably are chloride; and
and wherein R" when present, is as defined above and preferably is selected from the group consisting of a $C_1$-$C_{20}$ alkylene, and a silicon, and wherein said R" is optionally substituted with one or more substituents each independently selected from the group consisting of a halogen, a hydrosilyl, a $SiR_3$ group wherein R is a hydrocarbyl having 1 to 20 carbon atoms as defined herein, and a hydrocarbyl having 1 to 20 carbon atoms as defined herein.

In another preferred embodiment, the metallocenes which are used in a process according to the invention are represented by formula (I) or (II) as given above,
wherein Ar is as defined above, and wherein both Ar are different and are selected from the group consisting of cyclopentadienyl, indenyl, tetrahydroindenyl and fluorenyl, wherein each of said groups may be optionally substituted with one or more substituents each independently selected from the group consisting of halogen, a hydrosilyl, a $SiR_3$ group wherein R is a hydrocarbyl having 1 to 20 carbon atoms as defined herein, and a hydrocarbyl having 1 to 20 carbon atoms as defined herein;
wherein M is as defined above, and preferably is zirconium, wherein Q is as defined above, and preferably both Q are the same and are selected from the group consisting of chloride, fluoride and methyl, and preferably are chloride; and wherein R" when present is as defined above and preferably is selected from the group consisting of a $C_1$-$C_{20}$ alkylene, and a silicon, and wherein said R" is optionally substituted with one or more substituents each independently selected from the group consisting of a halogen, a hydrosilyl, a SiR$_3$ group wherein R is a hydrocarbyl having 1 to 20 carbon atoms as defined herein, and a hydrocarbyl having 1 to 20 carbon atoms as defined herein.

In an embodiment, the invention provides a process wherein said metallocene is ah unbridged metallocene.

In a preferred embodiment the invention provides a process wherein said metallocene is an unbridged metallocene of formula (I)

$$(Ar)_2MQ_2 \tag{I}$$

wherein said two Ar that are bound to M are the same and are selected from the group consisting of cyclopentadienyl, indenyl, and tetrayhydroindenyl, wherein each of said groups may be optionally substituted with one or more substituents each independently selected from the group consisting of halogen and a hydrocarbyl having 1 to 20 carbon atoms as defined herein;
wherein M is a transition metal selected from the group consisting of titanium, zirconium, hafnium and vanadium; and preferably is zirconium; and
wherein both Q are the same and are selected from the group consisting of chloride, fluoride and methyl, and preferably are chloride.

In a preferred embodiment, the invention provides a process wherein said metallocene is an unbridged metallocene selected from the group comprising bis(iso-butylcyclopentadienyl) zirconium dichloride, bis(pentamethylcyclopentadienyl) zirconium dichloride, bis(tetrahydroindenyl) zirconium dichloride, bis(indenyl) zirconium dichloride, bis(1,3-dimethylcyclopentadienyl) zirconium dichloride, bis(methylcyclopentadienyl) zirconium dichloride, bis(n-butylcyclopentadienyl) zirconium dichloride, and bis(cyclopentadienyl) zirconium dichloride; and preferably selected from the group comprising bis(cyclopentadienyl) zirconium dichloride, bis(tetrahydroindenyl) zirconium dichloride, bis(indenyl) zirconium dichloride, and bis(n-butyl-cyclopentadienyl) zirconium dichloride.

In another embodiment, the invention provides a process wherein said metallocene is a bridged metallocene.

In a preferred embodiment the invention provides a process wherein said metallocene is an bridged metallocene of formula (II)

$$R''(Ar)_2MQ_2 \tag{II}$$

wherein said two Ar that are bound to M are the same and are selected from the group consisting of cyclopentadienyl, indenyl, and tetrayhydroindenyl, wherein each of said groups may be optionally substituted with one or more substituents each independently selected from the group consisting of halogen and a hydrocarbyl having 1 to 20 carbon atoms as defined herein;
wherein M is a transition metal selected from the group consisting of titanium, zirconium, hafnium and vanadium; and preferably is zirconium;
wherein both Q are the same and are selected from the group consisting of chloride, fluoride and methyl, and preferably are chloride, and
wherein R'' is selected from the group consisting of a $C_1$-$C_{20}$ alkylene, and a silicon, and wherein said R'' is optionally substituted with one or more substituents each independently selected from the group consisting of a halogen, and a hydrocarbyl having 1 to 20 carbon atoms as defined herein.

In a preferred embodiment, the invention provides a process wherein said metallocene is a bridged metallocene selected from the group comprising ethylenebis(4,5,6,7-tetrahydro-1-indenyl)zirconium dichloride, ethylenebis(1-indenyl) zirconium dichloride, dimethylsilylene bis(2-methyl-4-phenyl-inden-1-yl)zirconium dichloride, dimethylsilylene bis(2-methyl-1H-cyclopenta[a]naphthalen-3-yl)zirconium dichloride, cyclohexylmethylsilylene bis[4-(4-tert-butylphenyl)-2-methyl-inden-1-yl]zirconium dichloride, dimethylsilylene bis[4-(4-tert-butylphenyl)-2-(cyclohexylmethyl)inden-1-yl]zirconium dichloride.

In another preferred embodiment the invention provides a process wherein said metallocene is an bridged metallocene of formula (II)

$$R''(Ar)_2MQ_2 \tag{II}$$

wherein said two Ar that are bound to M are different and are selected from the group consisting of cyclopentadienyl and fluorenyl, wherein each of said groups may be optionally substituted with one or more substituents each independently selected from the group consisting of halogen and a hydrocarbyl having 1 to 20 carbon atoms as defined herein;
wherein M is a transition metal selected from the group consisting of titanium, zirconium, hafnium and vanadium; and preferably is zirconium;
wherein both Q are the same and are selected from the group consisting of chloride, fluoride and methyl, and preferably are chloride, and
wherein R'' is selected from the group consisting of a $C_1$-$C_{20}$ alkylene, and a silicon, and wherein said R'' is optionally substituted with one or more substituents each independently selected from the group consisting of a halogen, and a hydrocarbyl having 1 to 20 carbon atoms as defined herein.

In another preferred embodiment, the invention provides a process wherein said metallocene is a bridged metallocene selected from the group comprising diphenylmethylene (3-t-butyl-5-methyl-cyclopentadienyl) (4,6-di-t-butyl-fluorenyl) zirconium dichloride, di-p-chlorophenylmethylene (3-t-butyl-5-methyl-cyclopentadienyl) (4,6-di-t-butyl-fluorenyl)zirconium dichloride, diphenylmethylene (cyclopentadienyl)(fluoren-9-yl)zirconium dichloride, dimethylmethylene (cyclopentadienyl)(2,7-ditert-butyl-fluoren-9-yl)zirconium dichloride, dimethylmethylene[1-(4-tert-butyl-2-methyl-cyclopentadienyl)](fluoren-9-yl)zirconium dichloride, diphenylmethylene[1-(4-tert-butyl-2-methyl-cyclopentadienyl)] (2,7-ditert-butyl-fluoren-9-yl)zirconium dichloride, dimethylmethylene[1-(4-tert-butyl-2-methyl-cyclopentadienyl)](3,6-ditert-butyl-fluoren-9-yl)zirconium dichloride and dimethylmethylene (cyclopentadienyl)(fluoren-9-yl)zirconium dichloride.

Metallocene compounds used in accordance with the present invention are immobilized on a support in the presence of an activating agent. In a preferred embodiment, alumoxane is used as an activating agent for the metallocene. The alumoxane can be used in conjunction with a catalyst in order to improve the activity of the catalyst during the polymerization reaction. As used herein, the term alumoxane is used interchangeably with aluminoxane and refers to a substance, which is capable of activating the metallocene.

Alumoxanes used in accordance with the present invention comprise oligomeric linear and/or cyclic alkyl alumoxanes. In an embodiment, the invention provides a process wherein said alumoxane has formula (III) or (IV)

$$R\text{—}(Al(R)\text{—}O)_x\text{—}AlR_2 \tag{III}$$

for oligomeric, linear alumoxanes; or $$(\text{—}Al(R)\text{—}O\text{—})_y \tag{IV}$$

for oligomeric, cyclic alumoxanes
wherein x is 1-40, and preferably 10-20;
wherein y is 3-40, and preferably 3-20; and
wherein each R is independently selected from a $C_1$-$C_8$ alkyl, and preferably is methyl.

In a preferred embodiment, the alumoxane is methylalumoxane. Generally, in the preparation of alumoxanes from, for example, aluminum trimethyl and water, a mixture of linear and cyclic compounds is obtained. Methods for manufacturing alumoxane are known in the art and will therefore not be disclosed in detail herein.

In a particular embodiment, the invention provides a process wherein the molar ratio of aluminum, provided by the alumoxane, to transition metal, provided by the metallocene, of the polymerization catalyst is constant over the catalyst. Hence, the molar ratio of aluminum to transition metal is preferentially the same on the surface of the support and inside the pores of the support. In a preferred embodiment, the invention provides a process wherein the molar ratio of aluminum, provided by the alumoxane, to transition metal, provided by the metallocene, of the polymerization catalyst is comprised between 50 and 500, and for instance between 50 and 150, or between 100 and 150.

A polymerization catalyst according to the present invention can be prepared according to various methods. One method for instance comprises different successive impregnation steps of the support with the alumoxane until the pores of the support are saturated, after which excess alumoxane can adhere onto the surface of the support. It shall however be clear that other methods for preparing a polymerization catalyst according to the present invention may also be applied.

In a further embodiment the invention relates to a method for the polymerization of ethylene in an ethylene polymerization loop reactor, comprising the steps of;
feeding ethylene monomer, a diluent, optionally hydrogen, and optionally one or more co-monomer(s) to said ethylene polymerization loop reactor;
feeding a polymerization catalyst into said loop reactor;
polymerizing said monomer and said optional co-monomer to produce a polyethylene slurry comprising liquid diluent and solid polyethylene particles, and
recovering polyethylene particles from the slurry by separating at least a majority of the diluent from the slurry.
wherein said polymerization catalyst is as described herein.

In accordance with the invention, ethylene polymerizes in a liquid diluent in the presence of a polymerization catalyst as defined herein, optionally a co-monomer, optionally hydrogen and optionally other additives, thereby producing polymerization slurry comprising polyethylene.

As used herein, the term "polymerization slurry", "polyethylene slurry" or "polymer slurry" or "slurry" means substantially a multi-phase composition including at least polymer solids and a liquid phase, the liquid phase being the continuous phase. The solids include catalyst and a polymerized olefin, such as polyethylene. The liquids include an inert diluent, such as isobutane, dissolved monomer such as ethylene, co-monomer, molecular weight control agents, such as hydrogen, antistatic agents, antifouling agents, scavengers, and other process additives.

Suitable "ethylene polymerization" includes but is not limited to homo-polymerization of ethylene or the co-polymerization of ethylene and a higher 1-olefin co-monomer such as butene, 1-pentene, 1-hexene, 1-octene or 1-decene.

As used herein the term "co-monomer" refers to co-monomers which are suitable for being polymerized with ethylene monomers. Co-monomers may comprise but are not limited to aliphatic $C_3$-$C_{20}$ alpha-olefins. Examples of suitable aliphatic $C_3$-$C_{20}$ alpha-olefins include propylene, 1-butene, 4-methyl-1-pentene, 1-hexene, 1-octene, 1-decene, 1-dodecene, 1-tetradecene, 1-hexadecene, 1-octadecene and 1-eicosene.

Hydrocarbon diluents which are suitable for being used in accordance with the present invention may comprise but are not limited to hydrocarbon diluents such as aliphatic, cycloaliphatic and aromatic hydrocarbon solvents, or halogenated versions of such solvents. The preferred solvents are $C_{12}$ or lower, straight chain or branched chain, saturated hydrocarbons, $C_5$ to $C_9$ saturated alicyclic or aromatic hydrocarbons or $C_2$ to $C_6$ halogenated hydrocarbons. Nonlimiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, said diluent is isobutane. However, it should be clear from the present invention that other diluents may as well be applied according to the present invention.

According to another embodiment the invention provides a method wherein said ethylene polymerization loop reactor, as described above is a single loop reactor.

In another embodiment the invention provides a method wherein said ethylene polymerization loop reactor, as described above is a first reactor of a double loop reactor, i.e. a reactor consisting of two serially connected loop reactors.

A double loop reactor configuration can be used to prepare a bimodal polyethylene. "Bimodal polyethylene" or "bimodal polyethylene product" as used herein refers to a bimodal polyethylene resin comprising two components having different properties, such as for instance two components of different molecular weight; two components of different densities; and/or two components having different productivities or reaction rates with respect to co-monomer. In an example one of said fractions has a higher molecular weight than said other fraction. In another example, one of said fractions has a higher density than said other fraction. However, the invention is not limited to the regulation of bimodal molecular weights or densities only, but may be used for bimodal regulation of other aspects of resin products, such as, but not limited to, co-monomer introduction, polydispersity, stereospecificity, etc.

In an embodiment, a process for the preparation of a particulate bimodal polyethylene product in a serially connected double loop reactor is provided, comprising the steps of:
(a) feeding ethylene monomer, a liquid hydrocarbon diluent, at least one polymerization catalyst, optionally hydrogen, and optionally one or more olefin co-monomers to a first loop reactor;
(b) polymerizing said ethylene and said optionally one or more olefin co-monomers in said first loop reactor to produce a first polyethylene product;
(c) transferring said first polyethylene product to a second loop reactor;
(d) feeding ethylene monomer, a diluent, optionally hydrogen, and optionally one or more olefin co-monomers to said second loop reactor;
(e) polymerizing said ethylene and said optionally one or more olefin co-monomers in said second loop reactor in the presence of said first polyethylene product to produce a bimodal polyethylene product;
wherein said polymerization catalyst is as defined herein and comprises a particulate metallocene-alumoxane catalyst immobilized on a porous silica support wherein said alumoxane is heterogeneously distributed on said support.

The invention further relates to polyethylene products that are obtainable or obtained by carrying out a process according to the invention.

As used the person skilled in the art will appreciate that the nature, amounts and concentrations of the above given monomers, co-monomers, polymerization catalysts and additional compounds for the polymerization as well as the polymerization time and reaction conditions in each reactor can vary depending on the desired polyethylene product.

EXAMPLES

Figure 2A:
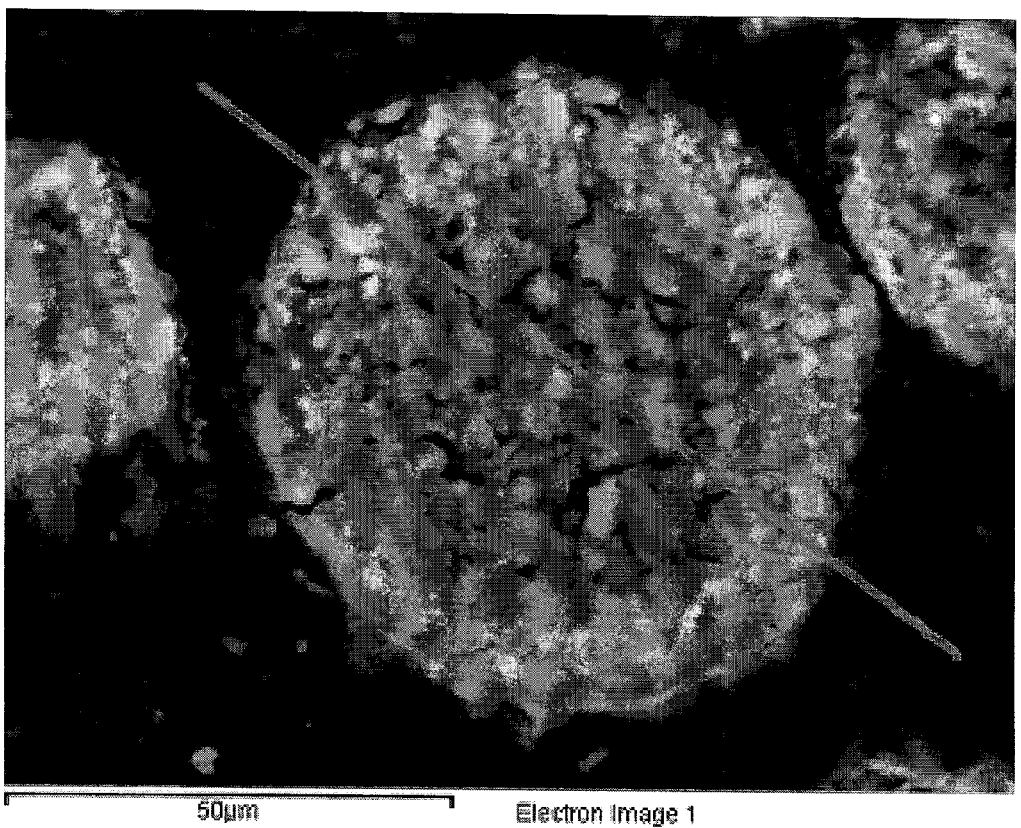
FIG. 2 represents scanning electron microscopy (SEM) image and energy-dispersive X-ray (EDX) spectra of a particulate metallocene-alumoxane catalyst immobilized on a porous silica support; and whereby said metallocene-alumoxane catalyst is heterogeneously distributed on said porous silica support, and which is suitable to use in the present invention. (A): SEM image of a particulate metallocene-alumoxane catalyst immobilized on a porous silica support; and whereby said metallocene-alumoxane catalyst is heterogeneously distributed on said porous silica support (B) EDX linescan spectrum showing counts of Al coming from the particle illustrated in (A). (C) EDX linescan spectrum showing counts of Si coming from the particle illustrated in (A). After normalization of each signal Al/Si was found to be equal to 2 in surface layer, (i.e. outer 30% of the volume of the particle), and Al/Si was found to be equal to 0.2 in core of the heterogeneous particle.
Figure 2B:
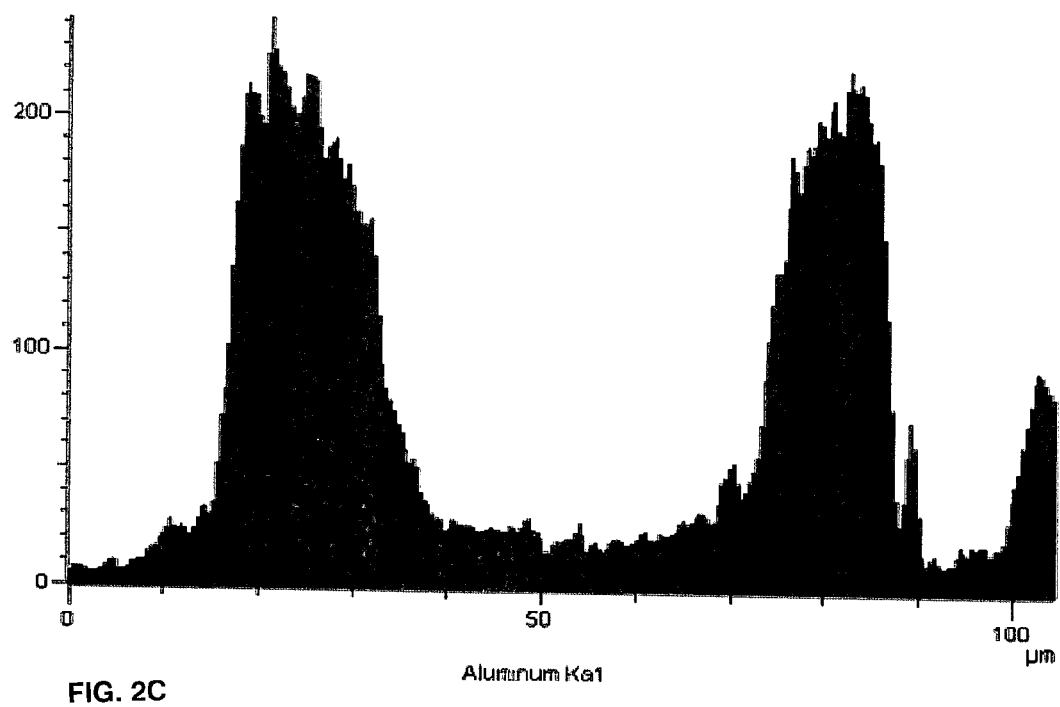
Figure 2C:
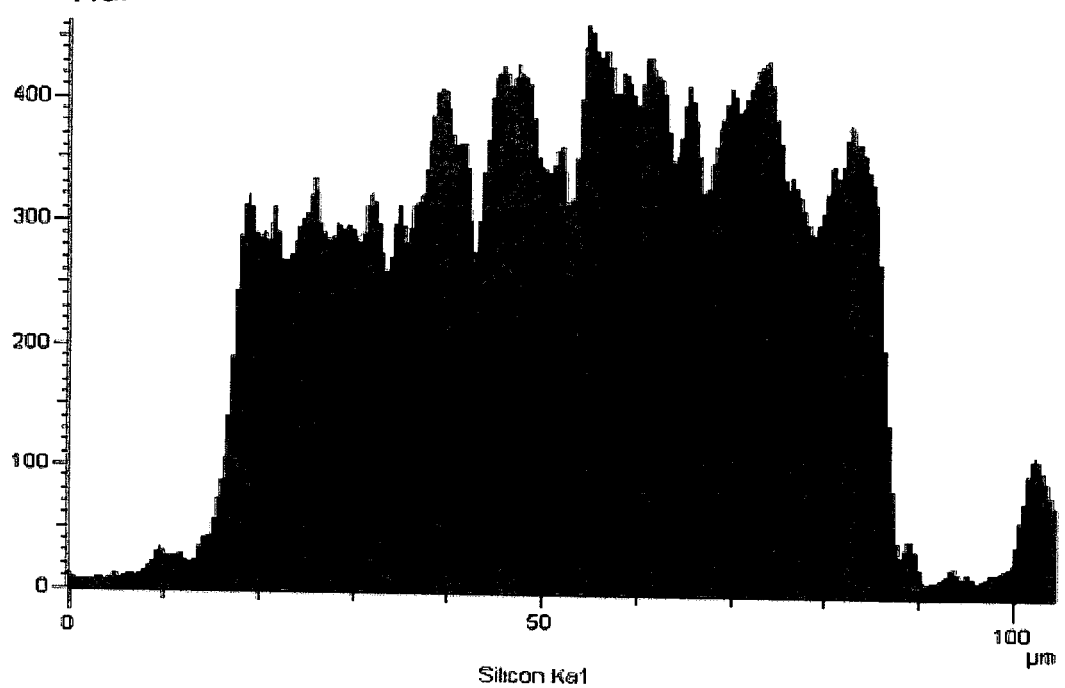

6% by weight of Ethylene monomer, with about 700 ppm in volume of H2 in the ethylene feed were added to a reactor, together with 40 ml hexene, 1 ml of alkylaluminium scavenger and about 2 L of isobutane diluent. 50 mg of particulate metallocene-alumoxane catalyst immobilized on a porous silica support wherein said alumoxane is heterogeneously distributed (referred as heterogeneous), was introduced in the reactor. The polymerization reaction was performed at 85° C. FIG. 2 represents scanning electron microscopy (SEM) image and energy-dispersive X-ray (EDX) spectra of a heterogeneously distributed metallocene catalyst which could be used for this reaction.

Figure 1B:
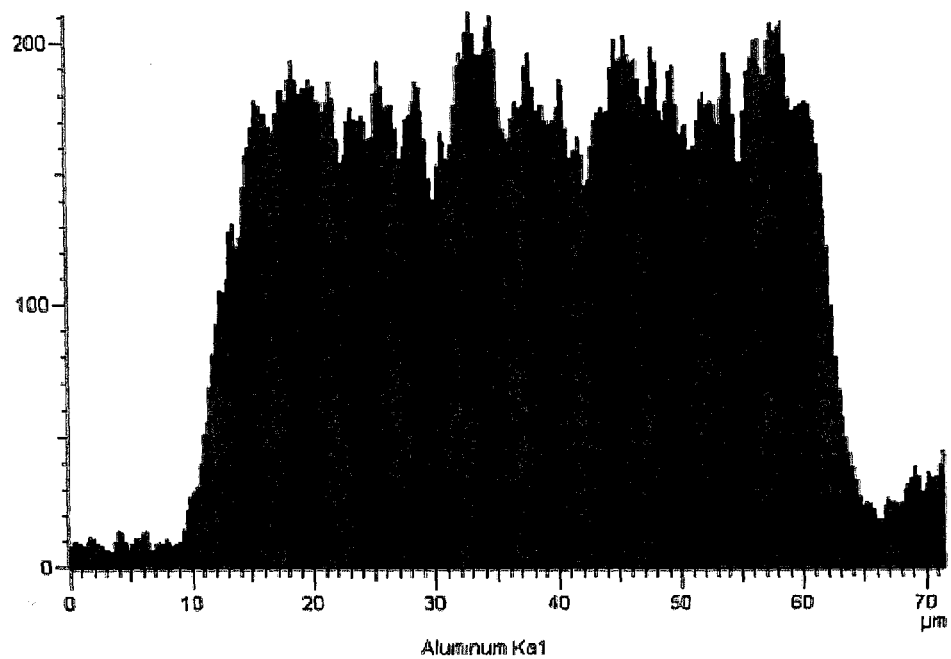
Figure 1C:
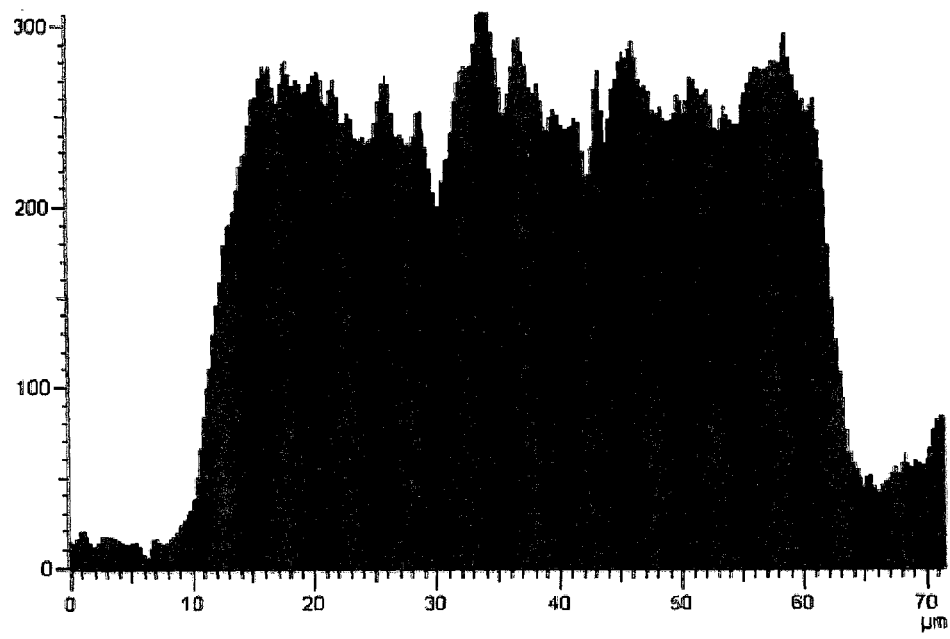

A comparative reaction was performed using 6% by weight of Ethylene monomer, with about 700 ppm in volume of H2 in the ethylene feed were added to a reactor, together with 40 ml hexene, 1 ml of alkylaluminium scavenger and about 2 L of isobutane diluent. 50 mg of particulate metallocene-alumoxane catalyst immobilized on a porous silica support wherein said alumoxane is homogeneously distributed (referred as homogeneous), was introduced in the reactor. The polymerization reaction was performed at 85° C. FIG. 1 represents scanning electron microscopy (SEM) image and energy-dispersive X-ray (EDX) spectra of a homogeneously distributed metallocene catalyst which could be used for this comparative reaction.

Figure 3:
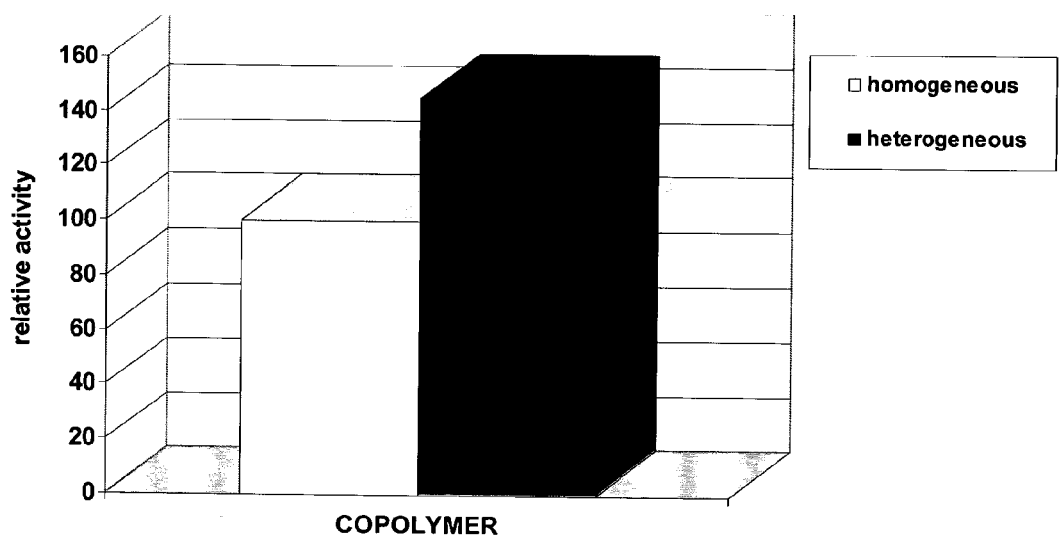
FIG. 3 represents a graph illustrating the relative activity on polymer production of a particulate metallocene-alumoxane catalyst immobilized on a porous silica support wherein said alumoxane is heterogeneously distributed on said support compared to the relative activity of a particulate metallocene-alumoxane catalyst immobilized on a porous silica support wherein said alumoxane is homogeneously distributed on said support.

The relative activity of the homogenous and heterogeneous catalysts on the copolymerization was compared and the results are shown in FIG. 3. The relative activity of the homogenously distributed catalyst was about 100 while the relative activity of the heterogeneously distributed catalyst was about 145, showing the benefits of using the herein described heterogeneously distributed polymerization catalyst in a polymerization method according to embodiments of the invention.

The invention claimed is:

1. A polymerization catalyst comprising a particulate metallocene-alumoxane catalyst immobilized on a porous support, wherein the alumoxane is heterogeneously distributed on the porous support.

2. The polymerization catalyst of claim 1, wherein the porous support is a porous silica support.

3. The polymerization catalyst of claim 2, wherein the molar ratio of aluminum, provided by the alumoxane, to silicon, provided by the porous silica support, is at least twofold higher at a surface of the porous silica support than inside the porous silica support.

4. The polymerization catalyst of claim 2, wherein the molar ratio of aluminum, provided by the alumoxane, to silicon, provided by the porous silica support inside of the porous silica support is between 0.2 and 0.8.

5. The polymerization catalyst of claim 2, wherein the molar ratio of aluminum, provided by the alumoxane, to silicon, provided by the porous silica support on the external surface of the porous silica support is between 0.4 and 8.

6. The polymerization catalyst of claim 1, wherein the porous support has a median particle diameter that is between 10 and 100 μm.

7. The polymerization catalyst of claim 1, wherein the porous support has a surface area that is between 200 and 700 $m^2/g$.

8. The polymerization catalyst of claim 1, wherein the porous support has a pore volume that is between 0.5 and 3 ml/g.

9. The polymerization catalyst of claim 1, wherein the porous support has an average pore diameter that is between 50 and 300 angstroms.

10. The polymerization catalyst of claim 1, wherein the molar ratio of aluminum, provided by the alumoxane, to transition metal, provided by the metallocene, in the polymerization catalyst is between 10 and 1000.

11. The polymerization catalyst of claim 1, wherein the metallocene is represented by formula (I) or formula (II):

$$(Ar)_2MQ_2 \text{ for non-bridged metallocenes;} \quad (I)$$

$$R''(Ar)_2MQ_2 \text{ for bridged metallocenes;} \quad (II)$$

wherein each Ar is independently selected from the group consisting of cyclopentadienyl, indenyl, tetrahydroindenyl, and fluorenyl;

wherein Ar is optionally substituted with one or more substituents each substituent independently selected from the group consisting of halogen, a hydrosilyl, an $SiR_3$ group wherein R is a hydrocarbyl having 1 to 20 carbon atoms, and a hydrocarbyl having 1 to 20 carbon atoms and wherein said hydrocarbyl optionally contains one or more atoms selected from the group consisting of B, Si, S, O, F, Cl, and P;

wherein M is a transition metal selected from the group consisting of titanium, zirconium, hafnium and vanadium;

wherein each Q is independently selected from the group consisting of halogen, a hydrocarboxy having 1 to 20 carbon atoms, and a hydrocarbyl having 1 to 20 carbon atoms wherein said hydrocarbyl optionally contains one or more atoms selected from the group consisting of B, Si, S, O, F, Cl and P;

wherein R" is a bridge between the two Ar and is selected from the group consisting of a $C_1$-$C_{20}$ alkylene, a germanium, a silicon, a siloxane, an alkylphosphine and an amine;

wherein R" is optionally substituted with one or more substituents each independently selected from the group consisting of a halogen, a hydrosilyl, a $SiR_3$ group wherein R is a hydrocarbyl having 1 to 20 carbon atoms, and a hydrocarbyl having 1 to 20 carbon atoms and wherein the hydrocarbyl optionally contains one or more atoms selected from the group consisting of B, Si, S, O, F, Cl and P.

12. The polymerization catalyst of claim 1, wherein the alumoxane is represented by formula (III) or formula (IV)

$$R\text{—}(Al(R)\text{—}O)_x\text{—}AlR_2 \text{ for oligomeric, linear alumoxanes;} \quad (III)$$

$$(\text{—}Al(R)\text{—}O\text{—})_y \text{ for oligomeric, cyclic alumoxanes;} \quad (IV)$$

wherein x is 1-40, y is 3-40, and each R is independently selected from a $C_1$-$C_8$ alkyl.

13. The polymerization catalyst of claim 1, wherein the metallocene comprises a transition metal zirconium.

14. The polymerization catalyst of claim 1, wherein the alumoxane is methylalumoxane.

15. The polymerization catalyst of claim 1, wherein the metallocene is heterogeneously distributed on the porous support.

16. The polymerization catalyst of claim 1, wherein the metallocene is an unbridged metallocene selected from the group consisting of:
bis(isobutylcyclopentadienyl)zirconium dichloride;
bis(pentamethylcyclopentadienyl)zirconium dichloride;
bis(tetrahydroindenyl)zirconium dichloride;
bis(indenyl)zirconium dichloride;
bis(1,3-dimethylcyclopentadienyl)zirconium dichloride;
bis(methylcyclopentadienyl)zirconium dichloride;
bis(n-butylcyclopentadienyl)zirconium dichloride; and
bis(cyclopentadienyl)zirconium dichloride.

17. The polymerization catalyst of claim 1, wherein the metallocene is an unbridged metallocene selected from the group consisting of:
bis(cyclopentadienyl)zirconium dichloride;
bis(tetrahydroindenyl)zirconium dichloride;
bis(indenyl)zirconium dichloride; and
bis(n-butyl-cyclopentadienyl)zirconium dichloride.

18. The polymerization catalyst of claim 1, wherein the metallocene is a bridged metallocene selected from the group consisting of:
ethylenebis(4,5,6,7-tetrahydro-1-indenyl)zirconium dichloride;
ethylenebis(1-indenyl)zirconium dichloride;
dimethylsilylene bis(2-methyl-4-phenyl-inden-1-yl)zirconium dichloride;
dimethylsilylene bis(2-methyl-1H-cyclopenta[a]naphthalen-3-yl)zirconium dichloride;
cyclohexylmethylsilylene bis[4-(4-tert-butylphenyl)-2-methyl-inden-1-yl]zirconium dichloride; and
dimethylsilylene bis[4-(4-tert-butylphenyl)-2-(cyclohexylmethyl)inden-1-yl]zirconium dichloride.

19. The polymerization catalyst of claim 1, wherein the metallocene is a bridged metallocene selected from the group consisting of:
diphenylmethylene(3-t-butyl-5-methyl-cyclopentadienyl)(4,6-di-t-butyl-fluorenyl)zirconium dichloride;
di-p-chlorophenylmethylene(3-t-butyl-5-methyl-cyclopentadienyl)(4,6-di-t-butyl-fluorenyl)zirconium dichloride;
diphenylmethylene(cyclopentadienyl)(fluoren-9-yl)zirconium dichloride;
dimethylmethylene(cyclopentadienyl)(2,7-ditert-butyl-fluoren-9-yl)zirconium dichloride;
dimethylmethylene[1-(4-tert-butyl-2-methyl-cyclopentadienyl)](fluoren-9-yl)zirconium dichloride;
diphenylmethylene[1-(4-tert-butyl-2-methyl-cyclopentadienyl)](2,7-ditert-butyl-fluoren-9-yl)zirconium dichloride;
dimethylmethylene[1-(4-tert-butyl-2-methyl-cyclopentadienyl)](3,6-ditert-butyl-fluoren-9-yl)zirconium dichloride; and
dimethylmethylene(cyclopentadienyl)(fluoren-9-yl)zirconium dichloride.

* * * * *